Patented Mar. 6, 1951

2,544,296

UNITED STATES PATENT OFFICE 2,544,296

1-(p-TOLYLTHIO)-3-TRIMETHYLSILYL-PROPANE

Charles A. Burkhard, Alplaus, N. Y., assignor to General Electric Company, a corporation of New York No Drawing. Application August 18, 1949, Serial No. 111,092

1 Claim. (Cl. 260—448.2)

The present invention relates to a new chemical compound, 1-(p-tolylthio)-3-trimethylsilylpropane having the formula

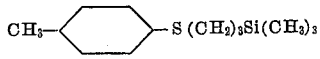

and to its preparation.

In accordance with this invention, the compound is prepared by mixing allyltrimethylsilane with p-thiocresol and agitating the mixture to promote an exothermic reaction between the two compounds. A small amount of benzoyl peroxide may be added to initiate the reaction.

The reaction appears to proceed exclusively by the addition of the S—H bond to the alkenyl radical as no sulfur is lost during the reaction and the products do not react with standard iodine solution indicating that the S—H bond has disappeared. The reaction may be represented by the equation

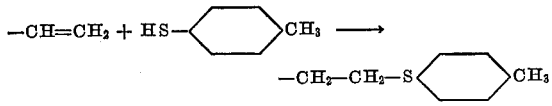

The 1-(p-tolylthio)-3-trimethylsilylpropane may be recovered by fractional distillation of the reaction products.

The following is a more specific example illustrating the preparation of the subject compound.

A mixture of 10 parts by weight of allyltrimethylsilane, 10 parts p-thiocresol and about 0.01 part benzoyl peroxide was shaken to aid the reaction and then allowed to stand overnight. Distillation of the reaction mixture yielded a clear liquid fraction boiling at 206–209° at 46 mm. which was identified as 1-(p-tolylthio)-3-trimethylsilylpropane. Its properties were:

$n_D^{20} = 1.5267$; $D_4^{20} = 0.9408$, mol. ref.; calculated 76.11, found 77.9; sulfur content calculated 13.45, found 13.45.

It is an oil-soluble high-boiling liquid which may be used as a lubricity additive for lubricating oils. The compound is stable and the presence of the sulfur in the delta position with respect to silicon does not appear to affect the stability of the carbon-silicon bond towards acids or bases.

What I claim as new and desire to secure by Letters Patent of the United States is:

1-(p-tolylthio)-3-trimethylsilylpropane.

CHARLES A. BURKHARD.

REFERENCES CITED

The following references are of record in the file of this patent:

UNITED STATES PATENTS

| Number | Name | Date |
|---|---|---|
| 2,352,435 | Hoeffelman | June 27, 1944 |

OTHER REFERENCES

Sommer, "Jour. Am. Chem. Soc.," vol. 70 (1948), pages 2872–2874.